United States Patent
Thein et al.

(10) Patent No.: US 11,277,722 B2
(45) Date of Patent: Mar. 15, 2022

(54) METHOD FOR OPERATING A ROADSIDE NETWORK UNIT AND ROADSIDE NETWORK UNIT

(71) Applicant: Robert Bosch GmbH, Stuttgart (DE)

(72) Inventors: Christoph Thein, Hildesheim (DE); Kurt Eckert, Ditzingen (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 16/631,893

(22) PCT Filed: Jun. 11, 2018

(86) PCT No.: PCT/EP2018/065268
§ 371 (c)(1),
(2) Date: Jan. 17, 2020

(87) PCT Pub. No.: WO2019/015867
PCT Pub. Date: Jan. 24, 2019

(65) Prior Publication Data
US 2020/0162867 A1    May 21, 2020

(30) Foreign Application Priority Data

Jul. 18, 2017 (DE) .......................... 102017212241.2
Oct. 13, 2017 (DE) .......................... 102017218316.0

(51) Int. Cl.
*H04W 4/44* (2018.01)
*H04L 1/00* (2006.01)
(Continued)

(52) U.S. Cl.
CPC ............. *H04W 4/44* (2018.02); *H04L 1/0026* (2013.01); *H04W 16/14* (2013.01); *H04W 80/08* (2013.01); *H04W 84/18* (2013.01); *H04W 92/18* (2013.01)

(58) Field of Classification Search
CPC .................................. H04W 4/44; H04L 1/00
See application file for complete search history.

(56) References Cited

U.S. PATENT DOCUMENTS

| | | | |
|---|---|---|---|
| 2009/0310608 A1* | 12/2009 | Chen | H04W 76/50 370/389 |
| 2010/0232404 A1* | 9/2010 | Chen | H04W 28/0226 370/338 |

(Continued)

FOREIGN PATENT DOCUMENTS

| | | |
|---|---|---|
| CN | 104754681 A | 7/2015 |
| WO | 2017071137 A1 | 5/2017 |

OTHER PUBLICATIONS

International Search Report for PCT/EP2018/065268, dated Sep. 10, 2018.

(Continued)

*Primary Examiner* — Zhiren Qin
(74) *Attorney, Agent, or Firm* — Norton Rose Fulbright US LLP; Gerard Messina

(57) ABSTRACT

A method for operating a roadside network unit is provided, which includes: ascertaining useful data for transmission to at least one further roadside network unit; providing the useful data for transmission on a sidelink channel in a licensed frequency range and/or for transmission on an ad hoc channel in an unlicensed frequency range; and transmitting the useful data on the sidelink channel in the licensed frequency range and/or on the ad hoc channel in the unlicensed frequency range.

8 Claims, 6 Drawing Sheets

(51) Int. Cl.
*H04W 16/14* (2009.01)
*H04W 80/08* (2009.01)
*H04W 84/18* (2009.01)
*H04W 92/18* (2009.01)

(56) References Cited

U.S. PATENT DOCUMENTS

| | | | |
|---|---|---|---|
| 2016/0205584 A1* | 7/2016 | Baek | H04W 72/0453 |
| | | | 455/553.1 |
| 2017/0006594 A1* | 1/2017 | Wei | H04W 72/1242 |
| 2017/0238321 A1* | 8/2017 | Sartori | H04W 4/80 |
| | | | 455/452.1 |
| 2017/0251347 A1* | 8/2017 | Mehta | H04W 4/90 |
| 2018/0014317 A1* | 1/2018 | Gulati | H04L 5/0005 |
| 2018/0077518 A1* | 3/2018 | Nguyen | H04W 4/06 |
| 2018/0352468 A1* | 12/2018 | Futaki | H04L 29/04 |
| 2020/0229019 A1* | 7/2020 | Baek | H04W 28/0215 |
| 2021/0243258 A1* | 8/2021 | Ma | H04L 67/34 |

OTHER PUBLICATIONS

ZTE: "Discussion on ENB Type RSU and UE Type RSU", 3GPP Draft, R2-162400 Discussion on ENB Type RSU and UE Type RSU, 3rd Generation Partnership Project (3GPP), Mobile Competence Centre, 650, Route Des Lucioles, F-06921 Sophia-Antipolis Cedex, France, BD. RAN WG2, NR. Dubrovnik, Croatia, Apr. 11, 2016-Apr. 15, 2016, 2016, XP051082085. URL :http ://www.3gpp.org/ftp/tsg_ran/wg2_rl2/tsgr2_93bi s/docs/.
3GPP TS 36.300 V14.2.0 (Mar. 2017), 330 pages.
ETSI EN 302 663 V1.2.0 (Nov. 2012), 24 pages.
IEEE 802.11P-2010 Standard IEEE Standard for Information Technology—Local and Metropolitan Area Networks—Specific Requirements—PART 11: Wireless LAN Medium Access Control (MAC) and Physical Layer (PHY) Specifications, Amendment 6: Wireless Access in Vehicular Environments, 51 pages.
ETSI TS 102 687 V1.1.1 (Jul. 2011), 45 pages.
3GPP TS 36.323 V14.3.0 (Jul. 2017), 46 pages.
3GPP TS 36.322 V14.0.0 (Jul. 2017), 48 pages.
3GPP TS 36.201 V14.1.0 (Apr. 2017), 17 pages.
ETSI ES 202 663 V1.1.0 (Nov. 2009), 27 pages.
ETSI EN 302 637-2 V1.3.1 (Sep. 2014), 44 pages.
ETSI EN 302 637-3 V1.2.1 (Sep. 2014), 73 pages.
ESTI 102 636-4-2 VI. 1.1 (Oct. 2013), 25 pages.

* cited by examiner

METHOD FOR OPERATING A ROADSIDE NETWORK UNIT AND ROADSIDE NETWORK UNIT

FIELD

The present invention relates to a method for operating a roadside network unit and to a roadside network unit.

BACKGROUND INFORMATION

Vehicles today are already able to exchange information with other vehicles in their vicinity (V2V: vehicle to vehicle). Vehicles may also communicate wirelessly with roadside infrastructure (V2I: vehicle to infrastructure). Likewise, the vehicle may communicate wirelessly with a back end server on the Internet (V2N: vehicle to network) or with a pedestrian terminal (V2P: vehicle to person). This communication is also referred to overall as vehicle to everything (V2X).

The development of new functions and services in the automotive industry, such as automated driving, benefits from V2X. Traffic safety, driving comfort and energy efficiency may be improved. This results in new products and business models for automotive manufacturers, automotive suppliers and other service providers.

The first generation of V2X applications, to be used in the years ahead, is based primarily on use on the road. Their purpose is to provide the driver with information about the road surroundings. Vehicles periodically provide status information (e.g. position, speed, acceleration, etc.) and/or event information (rescue operations, a broken-down vehicle, traffic jams). This information is generally transmitted locally in the form of text messages.

This event-based piece of information may be sent to a central network unit (base station, backend) by neighboring vehicles.

There are presently two competing technologies for V2X direct device-to-device (D2D) communication. The first technology is based on the radio-based IEEE 802.11p standard, which forms the basis for the comprehensive DSRC standard (Dedicated Short Range Communication) in the United States and the ETSI ITS G5 standard (ETSI: European Telecommunications Standards Institute; ITS: Intelligent Transport Systems) in Europe. The second technology is based on 3GPP (3rd Generation Partnership Project) LTE (Long Term Evolution) and is also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with a number of modifications. The MAC layer is based on enhanced distributed channel access (EDCA), which is competition-based. Carrier sense multiple access (CSMA) with collision avoidance (CSMA/CA) is also used. CSMA/CA follows the listen-before-talk principle for minimizing collisions on the channel. When a network unit (a vehicle in this context) has data to transmit, it carries out a channel measurement to check whether the channel is occupied. If the channel is detected to be empty, the network unit delays the planned transmission for a randomly ascertained time and then begins the transmission. If the channel is occupied during the channel measurement, the network unit will carry out a backoff procedure, i.e., it awaits the next channel access for a randomly ascertained period of time. The greater the number of network units attempting to transmit within a geographic area, the greater the probability that a network unit delays its transmission, which results in overall longer delays in the network. The IEEE 802.11p standard offers advantages over other WLAN standards based on IEEE 802.11 with regard to latency and signaling complexity and is adapted to the V2V application scenario.

The LTE extension for V2X in 3GPP Release 14 and higher provides to use a licensed and/or an unlicensed spectrum for the communication. The V2V communication is based on a direct device-to-device interface (also referred to as a sidelink interface on the physical layer). In contrast to 802.11p, the transmission takes place with cell support, i.e., it is carried out by the network in a planned manner. Transmission rights are granted by a scheduler unit situated in the base station, thus avoiding collisions and minimizing interferences. The control by the base station may be carried out only in areas in which the base station signal is available (in coverage). In a case in which no base station signal is available (out of coverage), the communication takes place via the sidelink, using predefined parameters.

During the course of developing communication standards—for example, based on different applications or development activities from different technological fields—various standards may be proposed for the same frequency range. As a result, different wireless communication systems would transmit in the same frequency range, resulting in performance impairments for both technologies.

Consequently, an objective technical task could be formulated in such a way that a coexistence mechanism for the two different wireless communication technologies is to be created to equitably distribute existing resources.

SUMMARY

An object of the present invention may be achieved by an example method for operating a roadside network unit and a roadside network unit.

According to a first aspect of the present invention, an example method for operating a roadside network unit is provided, which includes: ascertaining useful data for transmission to at least one further roadside network unit; providing the useful data for transmission on a sidelink channel in a licensed frequency range or for transmission on an ad hoc channel in an unlicensed frequency range; and transmission of the useful data on the sidelink channel in the licensed frequency range and/or on the ad hoc channel in the unlicensed frequency range.

According to a second aspect of the present invention, an example roadside network unit is provided. It includes a processor for ascertaining useful data for transmission to at least one further roadside network unit and for providing the useful data for transmission on a sidelink channel in a licensed frequency range or for transmission on an ad hoc channel in an unlicensed frequency range. The network unit includes two transceivers for a particular wireless communication network for transmission of the useful data on the sidelink channel in the licensed frequency range or on the ad hoc channel in the unlicensed frequency range.

Due to the fact that the useful data are transmitted on the sidelink channel in the licensed frequency range and/or on the ad hoc channel in the unlicensed frequency range, an advantageous distribution of the communication in the two frequency ranges is achieved. The higher the throughput degree using network units designed according to the second aspect, the better will this separation of the communication in the two frequency ranges function. The likelihood of collision on the sidelink channel and on the ad hoc channel is reduced accordingly, and both channels benefit. Consequently, the advantages of both network technologies may be used, simultaneously reducing a likelihood of collision.

Additional features and advantages of the present invention are described herein in the context of exemplary embodiments.

DETAILED DESCRIPTION OF EXAMPLE EMBODIMENTS

Figure 1:
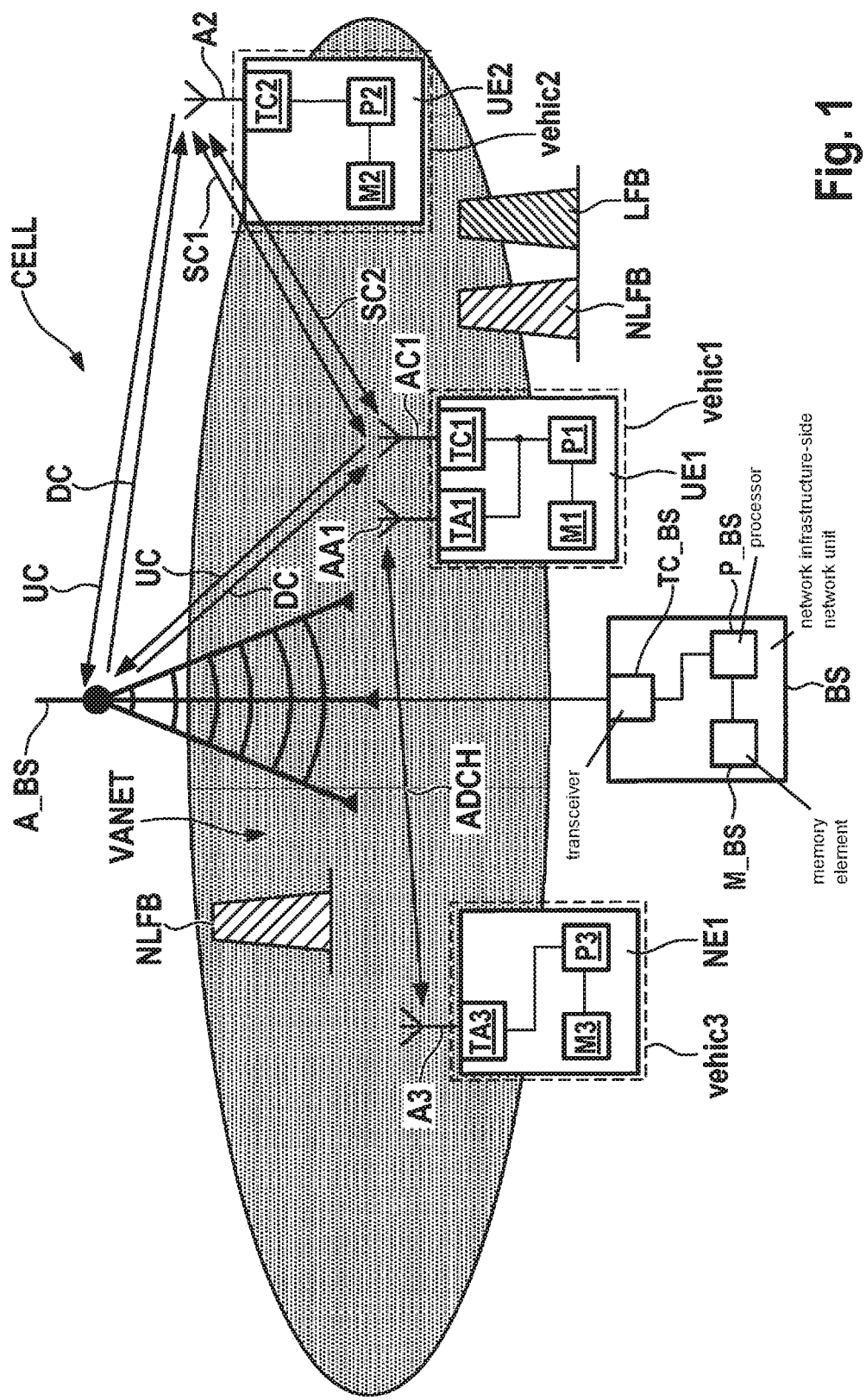
FIG. 1 shows a first cell-based wireless communication network and a second wireless communication network in accordance with the present invention.

FIG. 1 shows a cell-based wireless communication network CELL and an ad hoc wireless communication network VANET. Cell-based wireless communication network CELL includes a network infrastructure-side network unit BS, a roadside network unit UE1 and a roadside network unit UE2. Network infrastructure-side network unit BS includes a processor P_BS, a memory element M_BS and a transceiver TC_BS. Network infrastructure-side network unit BS may also be referred to as a base station or eNodeB. Network infrastructure-side network unit BS is connected to a stationary antenna A_BS for the purpose of transmitting data on a downlink channel DC and receiving data on an uplink channel UC. Antenna A_BS includes, for example, a number of antennas and is designed, for example, as a remote radio head (RRH). Network infrastructure-side network unit BS and antenna A_BS provide a cell C, within which roadside network units UE1 and UE2 communicate with network unit BS. Of course, network infrastructure-side network unit BS may have a distributed design within the scope of a virtualization and be made up of separate network units. Network units BS, UE1 and UE2 are configured, for example, according to the LTE-V2X standard.

Roadside network unit UE1 includes a processor P1, a memory element M1, a transceiver TA1 and a transceiver TC1. Transceiver TA1 is connected to an antenna AA1. Transceiver TC1 is connected to an antenna AC1. In one specific embodiment, antennas AA1 and AC1 are designed as a shared antenna element. Roadside network unit UE2 includes a processor T2, a memory element M2, a transceiver TC2 and an antenna A2. Particular computer programs are stored on memory elements M1, M2, M3, which implement the methods described in this description when executed on particular processor P1, P2, P3. Alternatively, processors P1, P2, P3 are designed as ASICs.

The two roadside network units UE1, UE2 are situated within cell C and are able to receive data on downlink channel DC and transmit data on uplink channel UC. The two roadside network units UE1, UE2 are able to communicate directly with each other via a sidelink channel SC1 in an unlicensed frequency range NLFB and via a sidelink channel SC2 in a licensed frequency range LFB.

National authorities, such as the Federal Network Agency of the Federal Republic of Germany, create a frequency usage plan that includes, for example, licenses for a particular network operator. Under the terms of the assigned license, the network operator is allowed to use the network infrastructure as well as terminals in an assigned, i.e., licensed, frequency range or frequency spectrum exclusively or as a member of a user group. In contrast, frequency ranges or frequency spectra exist, which are not assigned to a network operator and are freely usable under certain conditions, such as reduced transmission/reception power output.

In this description, reference is made to single uplink channel UC and single downlink channel DC. For example, uplink channel UC and downlink channel DC include particular subchannels, i.e., multiple channels are available in the uplink and in the downlink. The same applies to sidelink channels SC1, SC2.

Wireless communication network VANET includes roadside network unit UE1 and a network unit NE1. Network unit NE1 includes a processor P3, a memory element M3, a transceiver TA3 and an antenna A3. Transceivers TA1 and TA3 are configured, for example, according to the IEEE 802.11p standard. Network units UE1 and NE1 communicate directly with each other via an ad hoc channel ADCH in unlicensed frequency range NLFB. Ad hoc channel ADCH is arbitrated by transceivers TA1, TA3 via a CSMA/CA protocol (CSMA/CA: Carrier Sense Multiple Access/Collision Avoidance).

Network units NE1 and UE1 are situated in the vicinity of network unit UE2. Due to this proximity, the particular transmission power may be sufficient, so that transmissions on channels ADCH and SC1, which are transmitted in the same unlicensed frequency range NLFB, do not disadvantageously influence each other. The purpose of this description is to reduce this mutual disadvantageous influence.

Roadside network units UE1, UE2 and NE1 are situated in particular motor vehicles vehic1, vehic2, vehic3 and connected to a control unit situated therein, but not illustrated, for data exchange purposes. In an alternative specific embodiment, roadside network units UE1, UE2 and NE1 are part of the control unit in particular motor vehicle vehic1, vehic2, vehic3. In another alternative specific embodiment, roadside network units UE1, UE2 and NE1 are situated in a stationary infrastructure, for example a traffic light, instead of in a motor vehicle.

Sidelink channels SC1, SC2 and a sidelink in general are defined, for example, by the document 3GPP TS 36.300 V14.2.0 (2017 March), which is incorporated herein by reference in its entirety into the present description. The sidelink includes sidelink discovery, sidelink communication and V2X sidelink communication between network units UE1, UE2. The sidelink uses uplink resources and a physical channel structure similar to that of the uplink. The sidelink thus differs from the uplink with regard to the physical channel.

The sidelink is limited to individual cluster transmissions for the physical sidelink channels. The sidelink also uses a 1-symbol gap at the end of each sidelink subframe. A physical sidelink control channel (PSCCH) and a physical sidelink shared channel (PSSCH) are transmitted in the same subframe for the V2X sidelink communication. Sidelink channels SC1, SC2 are, for example, the PSSCH.

The physical layer processing of transport channels in the sidelink differs from the uplink transmission in the following steps: scrambling: The scrambling is not specific to the network unit for a physical sidelink discovery channel (PSDCH) and PSCCH; modulation: 64 QAM and 256 QAM are not supported for the sidelink (QAM: quadrature amplitude modulation). The PSCCH specifies sidelink resources and other transmission parameters, which are used by particular network unit UE1, UE2 for the PSSCH.

For the PSDCH, PSCCH and PSSCH demodulation, reference signals similar to the uplink demodulation reference signals are transmitted in the 4th symbol of the slot in the normal CP, cyclic prefix, and in the third symbol of the slot in the expanded CP. The sidelink demodulation reference signal sequence length corresponds to the size (number of subcarriers) of the assigned resource. For the V2X sidelink communication, reference signals are transmitted in the 3rd and 6th symbols of the first slot and in the 2nd and 5th symbols of the second slot in the CP. Reference signals based on a fixed base sequence, cyclical shift and orthogonal cover code are generated for PSDCH and PSCCH. For the V2X sidelink communication, the cyclical shift for PSCCH is randomly selected for each transmission.

For measurements of particular sidelink channel SC1, SC2, the following options are available on the part of network units UE1, UE2: reception power output of the sidelink reference signal (S-RSRP); reception power output of the sidelink discovery reference signal (SD-RSRP); reception power output of the PSSCH reference signal (PSSCH-RSRP); signal strength indicator for sidelink reference signals (S-RSSI).

Ad hoc channel ADCH and ad hoc wireless communication network VANET are defined, for example by the IEEE standard "802.11p-2010—IEEE standard for information technology—Local and metropolitan area networks—Specific requirements—Part 11: Wireless LAN medium access control (MAC) and physical layer (PHY) specifications, Amendment 6: Wireless access in vehicular environments," which is incorporated herein by reference in its entirety into the present description. IEEE 802.11p is a standard for enhancement of the WLAN standard IEEE 802.11. The objective of IEEE 802.11p is to establish the WLAN technology in passenger motor vehicles and to create a reliable interface for applications for intelligent transport systems (ITS). IEEE 802.11p is also the basis for dedicated short-range communication (DSRC) in the 5.85 GHz to 5.925 GHz frequency band. To avoid confusion with the European DSRC version, the term ITS-G5 is rather used instead of DSRC, primarily in Europe.

The document "ETSI EN 302 663 V1.2.0 (2012 November)," which is incorporated herein by reference in its entirety into the present description, describes the two lowermost layers of the ITS-G5 technology (ITS G5: Intelligent transport systems operating in the 5 GHz frequency band), the physical layer and the data link layer. Transceivers TA1 and TA3 implement, for example, these two lowermost layers and corresponding functions according to "ETSI TS 102 687 V1.1.1 (2011 July)," for the purpose of using ad hoc channel ADCH. The following unlicensed frequency ranges, which are part of unlicensed frequency range NLFB, are available for using ad hoc channel ADCH in Europe: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for operating ITS applications in the frequency range of 5.905 GHz to 5.925 GHz. ITS-G5 permits a communication between the two network units UE1 and UE2 outside the context of a base station. ITS-G5 permits the immediate exchange of data frames and avoids a management overhead, which is used in setting up a network.

The document "ETSI TS 102 687 V1.1.1 (2011 July)," which is incorporated herein by reference in its entirety into the present description, describes a "decentralized congestion control mechanism" for ITS-G5. Ad hoc channel ADCH is used, among other things, for exchanging data relating to traffic safety and traffic efficiency. Transceivers TA1 and TA3 implement, for example, the functions described in the document "ETSI TS 102 687 V1.1.1 (2011 July)." The applications and services in ITS-G5 are based on the cooperative behavior of the roadside network units, which form ad hoc network VANET (VANET: vehicular ad hoc network). Ad hoc network VANET permits time-critical road traffic applications, in which a rapid exchange of information is necessary to warn and assist the driver and/or the vehicle in a timely manner. To ensure proper functioning of ad hoc network VANET, decentralized congestion control mechanisms (DCC) are used for ad hoc channel ADCH of ITS-G5. DCC has functions that are situated on multiple layers of the ITS architecture. The DCC mechanisms are based on knowledge of the channel. The channel status information is obtained by channel sounding. Channel status information may be obtained by the transmit power control (TPC), transmit rate control (TRC) and transmit data rate control (TDC) methods. The methods ascertain the channel status information as a function of received signal level thresholds or preamble information of detected packets.

Figure 2:
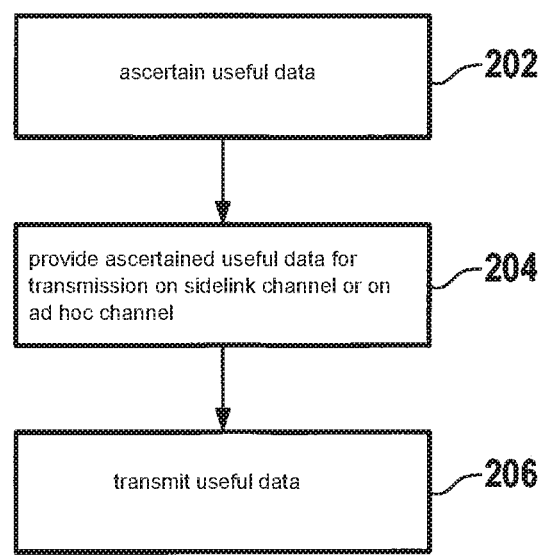
FIG. 2 shows a schematic flowchart in accordance with the present invention.

FIG. 2 shows a schematic flowchart for operating roadside network unit UE1 from FIG. 1. In a step 202, useful data are ascertained for transmission to another of the roadside network units. In a step 204, the ascertained useful data are provided for transmission on the sidelink channel in the licensed frequency range or for transmission on the ad hoc channel in the unlicensed frequency range. In a step 206, the useful data are transmitted either on the sidelink channel in the licensed frequency range or on the ad hoc channel in the unlicensed frequency range.

Figure 3:
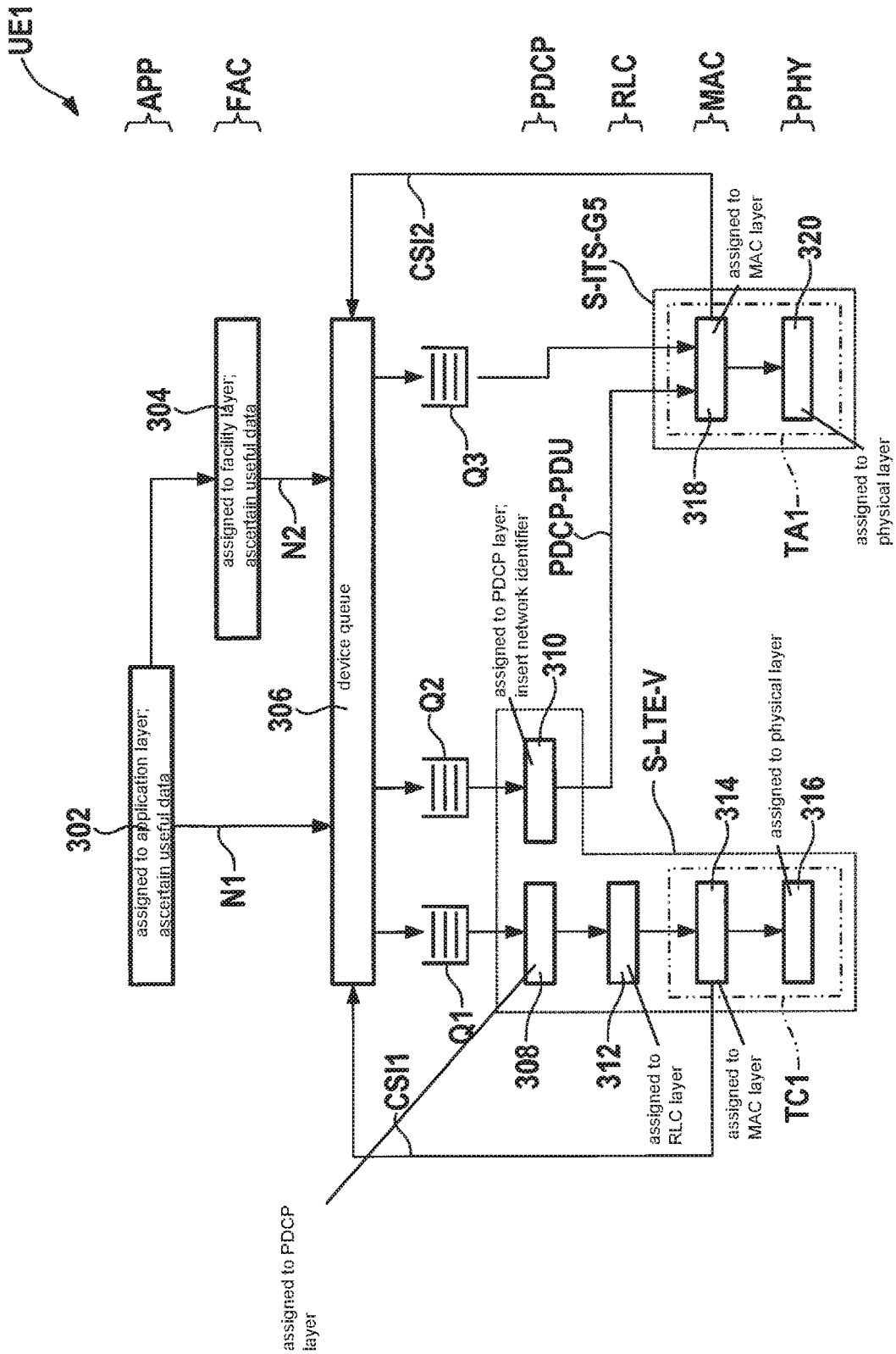
FIGS. 3 and 4 each show a schematic block diagram in accordance with the present invention.

FIG. 3 shows a schematic block diagram for operating roadside network unit UE1 from FIG. 1. A block 302 is assigned to an application layer APP. A block 304 is assigned to a facility layer FAC. Block 302 ascertains useful data N1. Block 304 ascertains useful data N2. Useful data N1, N2 may also be referred to as payload. A block 306 decides to which of the three queues Q1, Q2 and Q3 useful data N1, N2 are provided. Block 306 may also be referred to, for example, as the communication manager.

Blocks 308 and 310 are assigned to a PDCP layer (PDCP: packet data convergence protocol). Blocks 308 and 310 include, for example, the functionality according to the document "3GPP TS 36.323 V14.3.0 (2017 June), which is incorporated by reference into the present description. To distinguish between the two utilized types of wireless communication networks and corresponding protocol stacks, block 310 inserts a corresponding network identifier into generated data packet PDCP PDU (PDU: protocol data unit). This network identifier, which includes, for example, a single bit, makes it possible to advantageously determine on the receiver side the unit or the protocol stack to which the received data packet may be assigned and thus provided.

A block 312 is assigned to an RLC layer (RLC: radio link control) and includes, for example, the functionality according to the document "3GPP TS 36.322 V14.0.0 (2017 March)," which is incorporated herein by reference in its entirety into the present description. Block 312 accepts the data received from block 308 and ascertains data, which are forwarded to a block 314. A block 314 is assigned to a MAC layer (MAC: media access control) and includes, for example, the functionality according to the document "3GPP TS 36.323 V14.3.0 (2017 June)," which is incorporated by reference into the present description. Block 314 communicates with a block 316, which is assigned to a physical layer PHY. Block 316 includes, for example, the functionality according to the document "3GPP TS 36.201 V14.1.0 (2017 March)," which is incorporated by reference into the present description. Block 316 transmits data N1, N2 on sidelink channel SC2 from FIG. 1. Transceiver TC1 includes, for example, blocks 314 and 316.

A block 318 is assigned to MAC layer MAC and includes, for example, the functionality according to the document "ETSI EN 302 663 V1.2.0 (2012 November)," which is incorporated herein by reference in its entirety into the present description. Block 318 receives data to be transmitted from block 310 or from third queue Q3. Block 320 is assigned to physical layer PHY and transmits useful data N1, N2 on ad hoc channel ADCH from FIG. 1. Block 320 includes, for example, the functionality according to the document "ETSI ES 202 663 V1.1.0 (2009 November), which is incorporated herein by reference in its entirety into the present document. Transceiver TA1 includes, for example, blocks 318 and 320.

If useful data N1, N2 are present, for example, in the form of an IP packet (IP: Internet protocol) or in the form of a UDP packet (UDP: user datagram protocol), useful data N1, N2 are inserted into one of the two queues Q1, Q2 by block 306. Block 306 makes the decision as to which of queues Q1, Q2 into which useful data N1, N2 are inserted based on at least one of the following pieces of information: 1) the data type within the IP packet, i.e., for example, CAM or DENM; 2) the channel load on channels SC2, ADCH from FIG. 1, for example channel status information CSI1 and/or CSI2; 3) from transmission requests, such as latency, reliability, data volume, which are known from the application layer; 4) the availability of one and/or another of channels SC2, ADCH from FIG. 1.

If useful data N1, N2 are, for example, of one of types CAM or DENM described below, useful data N1, N2 are inserted into third queue Q3 by block 306. Of course, other types are also possible in addition to types CAM and DENM.

Messages of the CAM type (CAM: cooperative awareness message) are defined in the document "ETSI EN 302 637-2 V1.3.1 (2014 September)," which is incorporated herein by reference in its entirety into the present description. In road traffic, cooperative awareness means that the road users and the roadside infrastructure notify each other of their own position, vehicle dynamics and properties. Road users are all types of road vehicles, such as cars, trucks, motorcycles, bicycles and pedestrians, and roadside infrastructure, including road signs, traffic lights or barriers and gates. CAM messages are transmitted at regular time intervals, i.e., periodically. A CAM-type message which indicates an emergency vehicle or a traffic jam is used not only for traffic efficiency but also for traffic safety.

DENM-type messages (DENM: decentralized environmental notification message) are defined in the document "ETSI EN 302 637-3 V1.2.1 (2014 September)," which is incorporated herein by reference in its entirety into the present description. A DEN service (DEN: decentralized environmental notification) supports an RHW application (RHW: road hazard warning). The DEN service generates, manages and processes the DENM-type messages. A DENM-type message contains information about a road hazard or an abnormal traffic situation and the particular position. The DEN service supplies the DENM as the payload to the ITS network and transport layer for message distribution. An ITS application distributes a DENM-type message to the network units by direct vehicle-to-vehicle or vehicle-to-infrastructure communication on ad hoc channel ADCH. On the receiving side, the DEN service of a received ITS-S processes the received DENM-type message and supplies the DENM content to an application. This application transmits information to the driver or the vehicle if the information about the road traffic condition is relevant to the driver. The driver or the vehicle is then able to take corresponding measures to respond accordingly to the situation.

Alternatively or additionally to the type of useful data N1, N2, the decision is made as to which of the three queues Q1 through Q3 into which useful data N1, N2 are inserted as a function of local channel status information CSI1 and/or CSI2. Local channel status information CSI1 is ascertained by block 314 and includes, for example, a ratio between scheduled radio resources and free radio resources on the sidelink channel in the licensed frequency range. Local channel status information CSI2 is ascertained by block 318 and includes, for example, a number of roadside network units accessible directly via the ad hoc channel, i.e., a local density of roadside network units. Channel status information CSI2 indicates, for example, that the ad hoc channel in the unlicensed frequency range has a high occupancy, i.e., the number of detected accessible roadside network units in the vicinity exceeds a threshold value. If the ad hoc channel has a high occupancy, block 306 decides that useful data N1, N2 are inserted into first queue Q1.

In one specific embodiment, pieces of local channel status information CSI1 and CSI2 are compared with each other, and it is ascertained as a function of the comparison into which queue Q1, Q2 or Q3 useful data N1, N2 are inserted.

The insertion of data into queue Q1 means that a transmission of the inserted data takes place on the sidelink channel in the licensed frequency range. The insertion of data into queue Q2 means that a transmission of the inserted data takes place on the ad hoc channel in the unlicensed frequency range by connecting block 310 assigned to the PDCP layer therebetween. The insertion of data into queue Q3 means that a transmission of the inserted data takes place on the ad hoc channel in the unlicensed frequency range, the inserted data being immediately received, i.e., supplied directly, by block 318, which is assigned to the MAC layer. This means that useful data N1, N2, which are supplied from application layer APP or facility layer FAC to queue Q3 are provided from there directly to the MAC layer for transmission via the ad hoc channel.

Blocks 308, 310, 312, 314 and 316 are part of an LTE-V protocol stack S-LTE-V. Blocks 318 and 320 are part of an ITS-G5 protocol stack S-ITS-G5, in the present case only the two lowermost layers MAC and PHY being implemented, and the remaining layers not being provided exclusively for ITS-G5. Only one simplified transceiver TC1 is advantageously made possible thereby.

Figure 4:
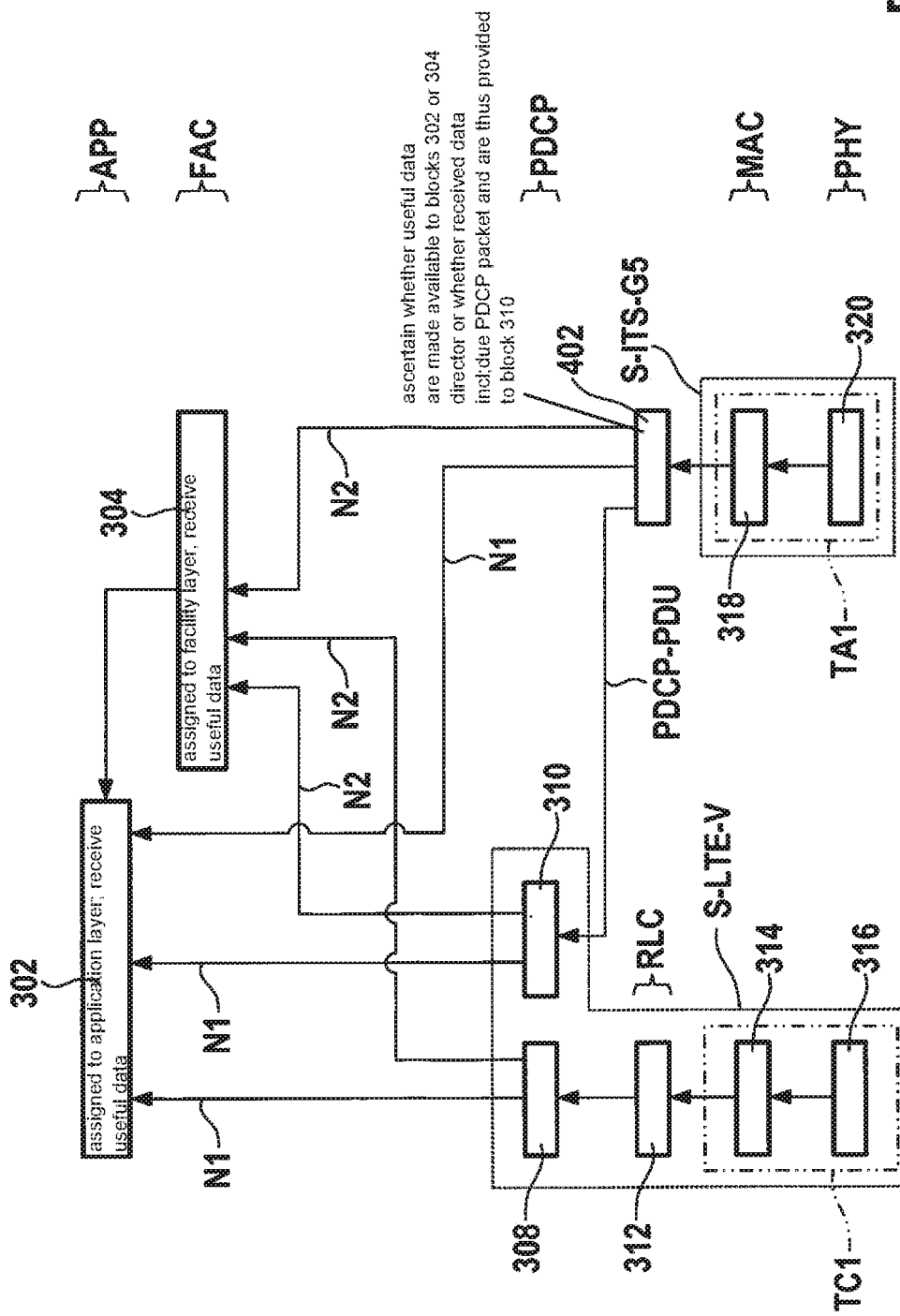

FIG. 4 shows a schematic block diagram for operating roadside network unit UE1 from FIG. 1. In contrast to FIG. 3, a receipt of useful data N1, N2 is illustrated. A block 402 ascertains, as a function of the data made available by block 318, either whether useful data N1, N2 are made available to blocks 302 or 304 directly, or whether the received data include a PDCP packet PDU and are thus provided to block 310.

Figure 5:
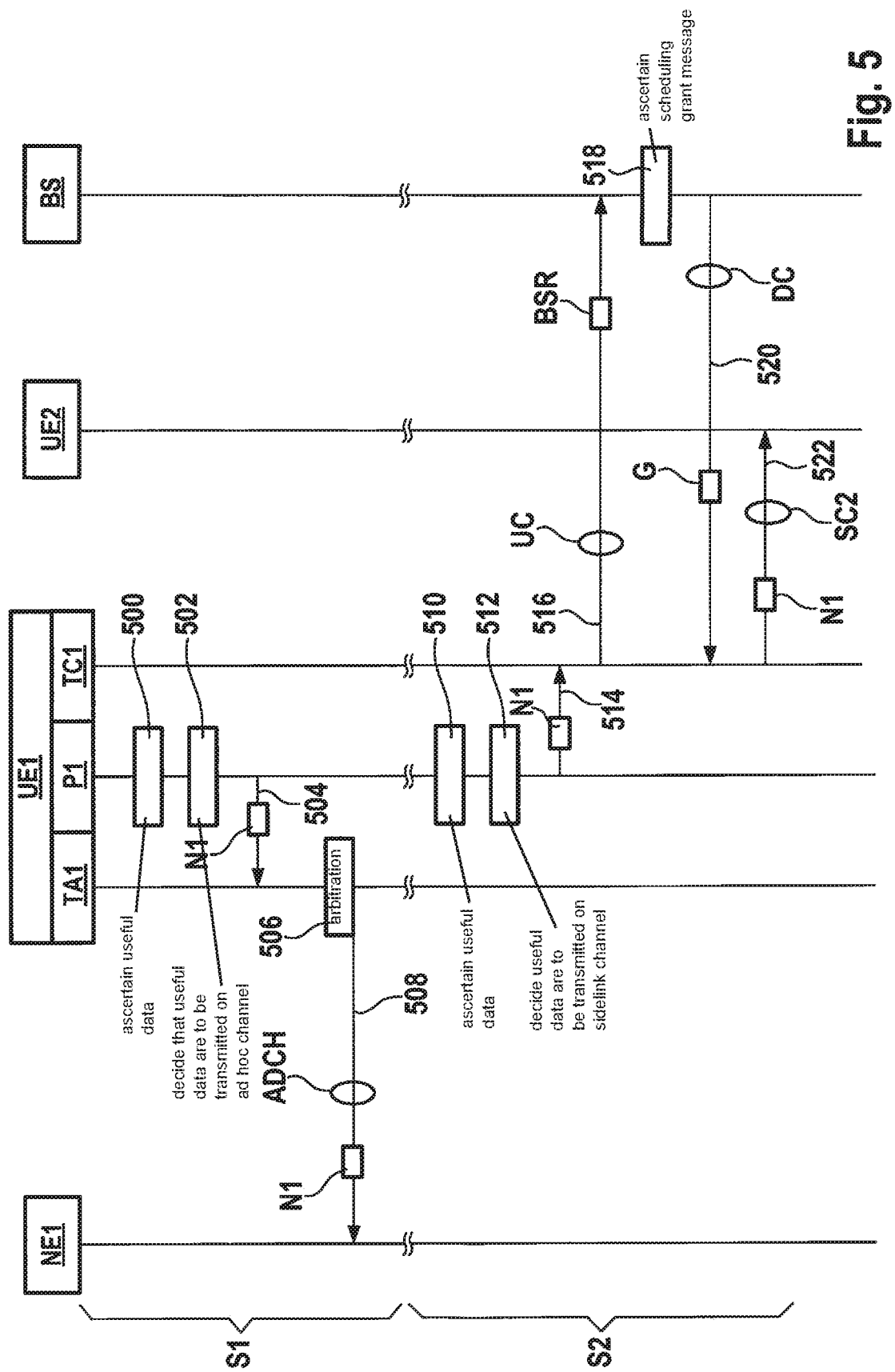
FIG. 5 shows a schematic sequence diagram in accordance with the present invention.

FIG. 5 shows a schematic sequence diagram, including sequences S1 and S2. In a step 500, useful data N1 are ascertained in the application layer. In a step 502, it is decided that ascertained useful data N1 are to be transmitted on ad hoc channel ADCH. In a step 504, useful data N1 are provided to transceiver TA1. In a step 506, transceiver TA1 carries out an arbitration of ad hoc channel ADCH. If the arbitration is successful, i.e., if ad hoc channel ADCH is free for a data transmission, transceiver TA1 transmits useful data N1 on ad hoc channel ADCH in the unlicensed frequency range in a step 508.

In a step 510, useful data N1 are ascertained in the application layer. In a step 512, it is decided that ascertained useful data N1 are to be transmitted on sidelink channel SC2. In a step 514, processor P1 makes useful data N1 available to transceiver TC1 for a transmission. In a step 516, transceiver TC1 transmits a scheduling request message BSR, for example a buffer status report, to network infrastructure-side network unit BS on uplink channel UC. A scheduling grant message G is ascertained in a step 518 and transmitted to roadside network unit UE1 on downlink channel DC in a step 520. Scheduling grant message G1 includes an assignment of radio resources on sidelink channel SC2. In a step 522, ascertained useful data N1 are transmitted to roadside network unit UE2 on assigned radio resources of sidelink channel SC2.

In one specific embodiment of step 502 and step 512, ascertained useful data N1 are linked with the transmission with the aid of a request. This request may take place in a traffic class of useful data N1, N2, in particular a traffic class according to the document "ESTI 636-4-2 V1.1.1 (2013 October)," which is incorporated herein by reference in its entirety in the present description. The traffic class resulting in the transmission on ad hoc channel ADCH includes, for example, useful data of the DENM and CAM types as well as additional possible types of useful data/messages. The traffic class resulting in the transmission on sidelink channel SC2 includes useful data of another type OTH, such as traffic-non-critical notices such as information for the driver.

In another specific embodiment of steps 502 and 512, the request for the transmission is a size of useful data N1, a latency request and/or a desired reliability of the transmission.

In another specific embodiment of steps 502 and 512, the request includes a transmission on the two channels SC2 and ADCH, whereby the transmission security is increased by redundancy.

In another specific embodiment of steps 502 and 512, channel status information CSI2 of the ad hoc channel is used to ascertain the decision for provision on one of channels ADCH, SC2. A provision for transmission on sidelink channel SC2 takes place when channel status information CSI2 indicates a high occupancy above a predefined threshold level. For example, the number of roadside network units directly accessible via ad hoc channel ADCH has exceeded a threshold value, so that a reliable delivery of useful data P1 may be guaranteed only via sidelink channel SC2. Accordingly, a provision of useful data P1 is carried out for transmission on sidelink channel SC2 according to steps 512 and 514 if the aforementioned threshold is exceeded.

In another specific embodiment of steps 502 and 512, channel status information CSI1 of the sidelink channel is used to ascertain the decision for provision on one of channels ADHC, SC2.

In another specific embodiment of steps 502 and 512, pieces of channel status information CSI1 and CSI2 are used to ascertain the decision for provision on one of channels ADHC, SC2.

In one specific embodiment of steps 502 and 512, useful data N1 are provided to second queue Q2 from FIG. 3 if the size of useful data N1 drops below a predefined threshold value. Such small amounts of data may be advantageously transmitted in the unlicensed frequency range.

Figure 6:
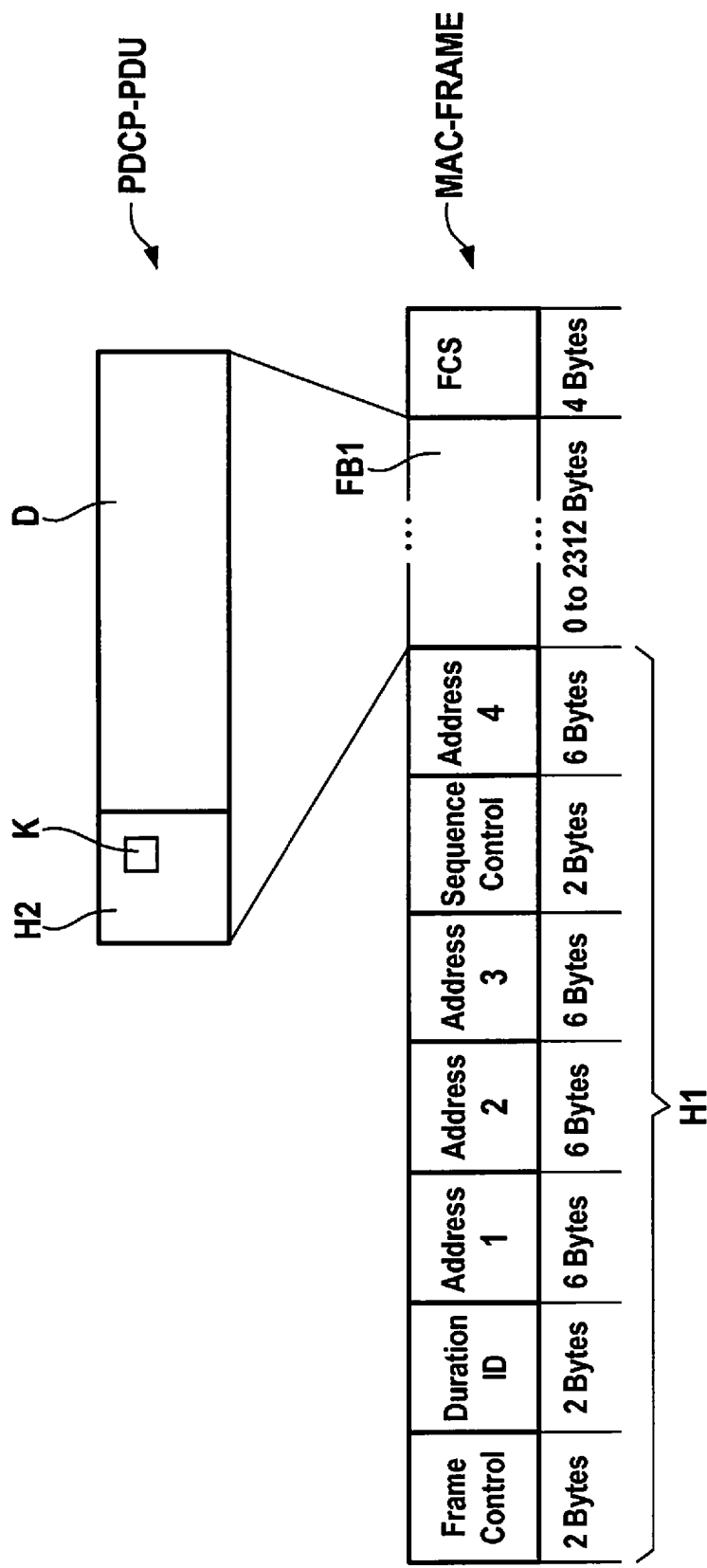
FIG. 6 shows a schematic structure of a data packet in accordance with the present invention.

FIG. 6 shows a schematic layout of a data packet MAC-FRAME according to IEEE 802.11 and explains the interaction between blocks 310 and 318. Data packet MAC-FRAME is created by block 318 in FIG. 3 and is read by block 318 in FIG. 4. Data packet MAC-FRAME includes a header H1, a frame body FB1 and a frame check sequence FCS.

Frame body FB1 includes data packet PDCP PDU, which includes a header H2 and a data part D, which includes, for example, the useful data.

Network identifier K is situated in header H2, which indicates the protocol stacks S-LTE-V, S-ITS-G5 to which particular data packet PDCP PDU is assigned. Accordingly, it is ascertained on the receiver side in block 402 as a function of network identifier K whether received frame body FB1 is provided to block 310 or to one of blocks 302 and 304. In an alternative specific embodiment, which is not illustrated, network identifier K is situated in an optional parameter field of header H1.

Additional aspects of present invention are described in the following paragraphs:

(Paragraph 1) A method for operating a first roadside network unit, the method including: ascertaining useful data for sending to at least one further roadside network unit; providing the useful data for transmission on a sidelink channel in a licensed frequency range and/or for transmission on an ad hoc channel in an unlicensed frequency range; and transmitting the useful data on the sidelink channel in the licensed frequency range and/or on the ad hoc channel in the unlicensed frequency range.

(Paragraph 2) The method according to Paragraph 1, the useful data being linked with a request for transmission, and the provision for transmission on the sidelink channel or for transmission on the ad hoc channel taking place as a function of the request.

(Paragraph 3) The method according to Paragraph 2, the request including a traffic class of the useful data, in particular a traffic class according to ETSI TS 102 636-4-2 V1.1.1 (2013 October).

(Paragraph 4) The method according to one of the preceding paragraphs, the method including: providing the useful data of a first type for transmission on the ad hoc channel; and providing the useful data of a second type for transmission on the sidelink channel.

(Paragraph 5) The method according to one of the preceding paragraphs, the request for transmission including a size of the useful data and/or a latency request and/or a reliability of the transmission of the useful data.

(Paragraph 6) The method according to one of the preceding paragraphs, a piece of local channel status information of the ad hoc channel being ascertained, and the provision taking place as a function of the local status information.

(Paragraph 7) The method according to one of the preceding paragraphs, the useful data being provided for transmission on the sidelink channel if the local channel status information indicates an occupancy of the ad hoc channel above a threshold value.

(Paragraph 8) The method according to one of the preceding paragraphs, the useful data of a PDCP layer being provided for transmission on the ad hoc channel if the size of the useful data drops below a threshold value.

(Paragraph 9) The method according to one of the preceding paragraphs, a protocol stack according to ITS-G5 not including any protocol layers above layer 2 which are exclusively assigned to ITS-G5.

(Paragraph 10) A roadside network unit, including: a processor for ascertaining useful data for transmission to at least one further roadside network unit; and for providing the useful data for transmission on a sidelink channel in a licensed frequency range and/or for transmission on an ad hoc channel in an unlicensed frequency range; and two transceivers for a particular wireless communication network for transmitting the useful data on the sidelink channel in the licensed frequency range and/or on the ad hoc channel in the unlicensed frequency range.

(Paragraph 11) The network unit according to Paragraph 10, which is designed for carrying out the method according to one of Paragraphs 1 through 9.

What is claimed is:

1. A method for operating a roadside network unit, the method comprising the following steps:
    ascertaining useful data for transmission to at least one further roadside network unit;
    providing the useful data for transmission on a sidelink channel in a licensed frequency range or for transmission on an ad hoc channel in an unlicensed frequency range; and
    transmitting the useful data on the sidelink channel in the licensed frequency range or on the ad hoc channel in the unlicensed frequency range;
    wherein a piece of local channel status information of the ad hoc channel is ascertained, and the provision takes place as a function of the local channel status information; and
    wherein the useful data are provided for transmission on the sidelink channel when the local channel status information indicates an occupancy of the ad hoc channel above a threshold value.

2. The method as recited in claim 1, wherein the useful data are linked with a request for transmission, and the provision for transmission on the sidelink channel or for transmission on the ad hoc channel takes place as a function of the request.

3. The method as recited in claim 2, wherein the request includes a traffic class of the useful data, the traffic class being a traffic class according to ETSI TS 102 636-4-2 V1.1.1 (2013-October).

4. The method as recited in claim 2, wherein the request for transmission includes a size of the useful data or a latency request or a reliability of the transmission of the useful data.

5. The method as recited in claim 1, wherein the method further comprising the following steps:
    providing the useful data of a first type for transmission on the ad hoc channel; and
    providing the useful data of a second type for transmission on the sidelink channel.

6. The method as recited in claim 1, wherein the useful data of a PDCP layer are provided for transmission on the ad hoc channel if a size of the useful data drops below a threshold value.

7. A method for operating a roadside network unit, the method comprising the following steps:
    ascertaining useful data for transmission to at least one further roadside network unit;
    providing the useful data for transmission on a sidelink channel in a licensed frequency range or for transmission on an ad hoc channel in an unlicensed frequency range; and
    transmitting the useful data on the sidelink channel in the licensed frequency range or on the ad hoc channel in the unlicensed frequency range;
    wherein a protocol stack according to ITS-G5 does not include any protocol layers above layer 2 which are assigned exclusively to ITS-G5.

8. A roadside network unit, comprising:
    a processor configured to ascertain useful data for transmission to at least one further roadside network unit and to provide the useful data for transmission on a sidelink channel in a licensed frequency range or for transmission on an ad hoc channel in an unlicensed frequency range; and
    two transceivers, each of the transceivers being for a particular wireless communication network for transmitting the useful data on the sidelink channel in the licensed frequency range or on the ad hoc channel in the unlicensed frequency range;
    wherein the processor is configured to ascertain a piece of local channel status information of the ad hoc channel, and the provision takes place as a function of the local channel status information; and
    wherein processor is configured to provide the useful data for transmission on the sidelink channel if the local channel status information indicates an occupancy of the ad hoc channel above a threshold value.

* * * * *